United States Patent

Matsuda et al.

[11] 3,903,032
[45] Sept. 2, 1975

[54] PROCESS FOR PREPARATION OF AMPHOTERIC POLYURETHANE EMULSIONS

[75] Inventors: Kazuo Matsuda; Hidemasa Ohmura; Hirakazu Aritaki, all of Wakayama, Japan

[73] Assignee: Kao Soap Co., Ltd., Tokyo, Japan

[22] Filed: Sept. 13, 1974

[21] Appl. No.: 505,679

[30] Foreign Application Priority Data
Sept. 18, 1973 Japan.............................. 48-105301

[52] U.S. Cl. .......................... 260/29.2 TN; 260/75 N; 260/77.5 AM; 260/584 R
[51] Int. Cl.² ...................... C08G 18/32; C08J 3/06
[58] Field of Search ................. 260/584 R, 77.5 AM, 29.2 TN

[56] References Cited
UNITED STATES PATENTS

| | | | |
|---|---|---|---|
| 3,278,560 | 10/1966 | Gaertner.......................... | 260/584 R |
| 3,419,533 | 12/1968 | Dieterich..................... | 260/29.2 TN |
| 3,479,310 | 11/1969 | Dieterich et al............. | 260/29.2 TN |
| 3,491,050 | 1/1970 | Keberle et al.............. | 260/29.2 TN |
| 3,836,493 | 9/1974 | Matsuda et al.............. | 260/29.2 TN |

*Primary Examiner*—John C. Bleutge
*Assistant Examiner*—Arthur H. Koeckert
*Attorney, Agent, or Firm*—Woodhams, Blanchard and Flynn

[57] ABSTRACT

A process for the preparation of amphoteric polyurethane emulsions comprising chain-extending a urethane prepolymer having isocyanate groups at the ends of the molecule by reacting it with a polyalkylene polyamine having at least two primary or secondary amino groups and also having a functional group of the formula:

$$-CH_2-CH(OH)-CH_2X$$

wherein X is Cl or Br, to form a polyurethane-urea-polyamine, rendering the amino groups of the resulting product amphoteric by reacting the resulting product with an amphoteric compound in an amount sufficient to emulsify the final polymer, said amphoteric compound being selected from the group consisting of 1,3-propanesultone, 1,4-butanesultone, β-propiolactone, γ-butyrolactone, ε-caprolactone, δ-valerolactone and sodium monohalogenated carboxylates having the formula $$X'-(CH_2)_n COONa$$

in which X' is halogen and $n$ is an integer of 1 or 2, or by reacting the resulting product with a compound selected from the group consisting of methyl acrylate, ethyl acrylate, methyl methacrylate, ethyl methacrylate and acrylonitrile and hydrolyzing the resulting reaction product, and then mixing the resulting amphoteric polymer with water.

9 Claims, No Drawings

PROCESS FOR PREPARATION OF AMPHOTERIC POLYURETHANE EMULSIONS

BACKGROUND OF THE INVENTION

1. Field of the Invention

This invention relates to a process for preparing polyurethane emulsions. More particularly, this invention relates to a process for preparing homogeneous stable amphoteric selfemulsifiable polyurethane emulsions.

2. Description of the Prior Art

Various processes for the preparation of polyurethane emulsions have been known in the art. For example, an emulsifier-free polyurethane emulsion, namely, a so-called self-emulsifiable polyurethane emulsion, can be prepared by a process comprising reacting a polyhydroxyl compound with an excess of an organic polyisocyanate to form a urethane prepolymer having terminal isocyanate groups, chain-extending the urethane prepolymer with an active hydrogen atom-containing chain extender to form a polyurethane having primary or secondary amino or hydroxyl groups, reacting the resulting product with a sultone, a lactone or the like and mixing the reaction product with water.

According to another known process, a polyurethane composition can be dispersed in water in the presence of an emulsifier.

In general, polyurethane resins have excellent physical and chemical properties. In practical use of polyurethane emulsions, however, there is a serious problem. More specifically, the physical and chemical properties of polyurethane resin films obtained from polyurethane emulsions prepared according to conventional processes, such as those mentioned above, are greatly inferior to the physical and chemical properties of films made of cross-linked type polyurethane resins, because it is difficult to introduce the cross-linkages in the polyurethane by chemical means or because of the presence of residual emulsifier in the polyurethane resin.

In general, when a polyurethane-containing polymer having tight cross-linkages is used, handling of the polymer during the preparation steps is very difficult because the polymer is infusible and insoluble. Accordingly, it is substantially impossible to obtain an emulsion by dispersing such a polymer into water, and even if such polyurethane polymer can be dispersed in water, in many cases the resulting emulsion is very unstable.

As an effective measure for overcoming this problem, there can be mentioned a process comprising reacting a urethane prepolymer with an excess of a polyalkylene polyamine, reacting the resulting polyurethane-urea-polyamine with an epihalohydrin, reacting the resulting product with the sultone, lactone or sodium monohalogenated carboxylate in an amount sufficient to emulsify the final polymer, and mixing the resulting reaction product with water to form a polyurethane emulsion. However, in this process, because the reaction between the polyurethane-urea-polyamine and epihalohydrin is conducted in a polymeric system, the reactivity of the polyurethane-urea-polyamine is low and hence, in many cases cross-linkages are not formed at a sufficient density in the heat-treated films prepared from the emulsions prepared according to this process.

SUMMARY OF THE INVENTION

We have discovered amphoteric self-emulsifiable polyurethane emulsions containing a functional group having a cross-linkage-forming property.

More specifically, we have discovered that the halohydrin structure is very effective as a reactive functional group for forming cross-linkages during the heat treatment of a polyurethane resin, and that a polyalkylene polyamine having a functional group of the formula —CH$_2$—CH(OH)—CH$_2$X, in which X is Cl or Br, is very effective as a compound for both chain-extending a urethane prepolymer and introducing a selected amount of a halohydrin group into the resulting polymer.

In accordance with this invention, there is provided a process for preparing amphoteric polyurethane emulsions which comprises chain-extending a urethane prepolymer having terminal isocyanate groups, which is prepared from a polyhydroxyl compound and an excess of a polyisocyanate, with a polyalkylene polyamine having a functional group represented by the formula —CH$_2$—CH(OH)—CH$_2$X, in which X is Cl or Br, thereby to form a polyurethane-urea-polyamine, reacting the thus-formed product amphoteric with a sultone, lactone or sodium monohalogenated carboxylate, or with an acrylate or acrylonitrile followed by hydrolysis, and mixing the resulting reaction product with water thereby to form an amphoteric self-emulsifiable polyurethane emulsion. The resin component in the thus-formed polyurethane emulsion either has no cross-linkages or it has only a very small number of cross-linkages. When a polyurethane resin film obtained by drying this polyurethane emulsion is heat-treated, tough cross-linkages are formed and the physical and chemical properties of the polyurethane resin are highly improved. This specific property of the polyurethane emulsion, according to this invention, is one of the prominent advantages of this invention.

The polyalkylene polyamine having a functional group of the formula —CH$_2$—CH(OH)—CH$_2$X, in which X is Cl or Br, which is used in this invention as a chain extender for a urethane prepolymer, is a reaction product obtained by reacting a polyalkylene polyamine with an epihalohydrin such as epichlorohydrin and epibromohydrin. It has the following formula (1)

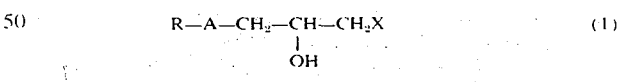

wherein X is Cl or Br, A is a secondary or tertiary amino group and R is an alkylene group having at least one primary or secondary amino group, with the proviso that the compound represented by the general formula includes at least two primary or secondary amino groups.

Accordingly, a polyurethane-urea-polyamine obtained by chain-extending a urethane prepolymer with a chain extender having the formula (1) contains a halohydrin structure in the molecule. Because of the presence of this halohydrin structure, tough cross-linkages are formed when a film of the resulting emulsion is heated.

The polyurethane-urea-polyamine used in this invention is obtained by reacting a urethane prepolymer having terminal isocyanate groups, which is derived from a polyhydroxyl compound and an excess of a polyfunctional isocyanate, with a chain extender of the formula (1) preferably in ketone type solvent, such as acetone or methyl ethyl ketone.

As the polyfunctional isocyanate, there can be employed, for example, aromatic, aliphatic and alicyclic diisocyanates such as 1,5-naphthylene diisocyanate, 4,4'-diphenylmethane diisocyanate, 4,4'-diphenyldimethylmethane diisocyanate, di-and tetra-alkyldiphenylmethane diisocyanates, 4,4'-dibenzyl diisocyanate, 1,3-phenylene diisocyanate, 1,4-phenylene diisocyanate and tolylene diisocyanates, chlorinated isocyanates, brominated isocyanates, phosphorus-containing isocyanates, 1,4-butylene diisocyanate, 1,6-hexamethylene diisocyanate, lysine diisocyanate, dicyclohexylmethane diisocyanate, cyclohexane-1,4-diisocyanate, xylene diisocyanate, and the like. Further, it is possible to employ triisocyanates such as 1-methylbenzol-2,4,6-triisocyanate, biphenyl-2,4,4'-triisocyanate and triphenylmethane triisocyanate in combination with the above-mentioned diisocyanates.

The polyhydroxyl compounds used in the preparation of a urethane prepolymer to be used in the process of this invention are those having a molecular weight of 200 to 10,000. Any of the known polyhydroxyl compounds customarily used for the preparation of polyurethanes, such as polyethers, polyesters, polyester amides, polyacetals, polythioethers, polybutadieneglycols and the like can be used in this invention.

As the polyether, there can be mentioned, for example, cyclic ethers such as those obtained by the ring-opening polymerization or copolymerization of ethylene oxide, propylene oxide, butylene oxide, tetrahydrofuran and the like, and graft copolymers thereof.

Further, homogeneous polyethers or mixed polyethers formed by condensation of, for example, hexanediol, methylhexanediol, heptanediol and octanediol can be employed. It is also possible to use propoxylated and ethoxylated glycols.

As typical examples of the polyester, there can be mentioned polyester glycols obtained by dehydrogenating condensation of dibasic acids and saturated or unsaturated low-molecular-weight glycols such as ethyleneglycol, propyleneglycol, 1,3-butanediol, 1,4-butanediol, neopentylglycol, pentanediol, hexanediol, octanediol, 2-ethyl-1,3-hexanediol, 1,4-butynediol, bisphenol A, diethyleneglycol, dipropyleneglycol and the like, and polyester glycols obtained by ring-opening polymerization of cyclic ester compounds.

As the polythioether, there are preferably employed homopolycondensation products of thioglycols and copolycondensation products of thioglycols with other glycols.

As the polyacetal, there can be mentioned, for example, water-insoluble polyacetals derived from hexanediol or 4,4'-dioxyethoxydiphenylmethane and formaldehyde.

Glycols customarily used together with the above polyhydroxyl compounds, such as ethyleneglycol, diethyleneglycol, triethyleneglycol, butanediol, propanediol, 1,6-hexanediol, neopentylglycol and N-alkyldiethanol amines having an alkyl group of one to 22 carbon atoms can be used in combination with the polyols, if necessary.

As the polyalkylene polyamine used in the process of this invention, there can be used various polyalkylene polyamines such as polyethylene polyamine, polypropylene polyamine, polybutylene polyamine and the like in this invention.

More particularly, the polyalkylene polyamine used in this invention are polyamines containing in the molecule from two to about four connecting units having the formula $—C_nH_{2n}—$, wherein $n$ is an integer larger than one, usually from 2 to 6. The connecting units connect together the nitrogen atoms. The nitrogen atoms may be bound to adjacent carbon atoms in the $—C_nH_{2n}—$ unit but they may not be bound to the same carbon atom.

The polyamines have the formula

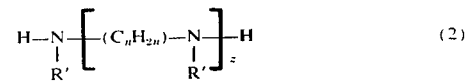

(2)

wherein $n$ is as defined above, $z$ is an integer from 2 to 4, and R', which can be the same or different, are hydrogen, alkyl having one to four carbon atoms or hydroxyalkyl having one to four carbon atoms.

More specifically, there can be used not only such polyamines as diethylene triamine, triethylene tetramine, tetraethylene pentamine and dipropylene triamine but also mixtures and various crude products containing these polyamines.

It is also possible to use hydroxyalkyl-substituted polyamines in combination with the foregoing polyamines.

In some cases, in order to change the density of hydrophilic groups in the polyurethane emulsion obtained according to this invention or to improve the properties of the films made from the emulsion, it is preferred to change or increase the distance between the active hydrogen-containing amino groups in the polyurethane-urea-polyamine molecule. This can be accomplished by substituting a part of the polyalkylene polyamine, with ethylene diamine, propylene diamine, hexamethylene diamine, piperazine, phenylene diamine, a substitution product of such diamine with a saturated alkyl group of one to 22 carbon atoms, or an alkyleneoxide adduct, acrylonitrile adduct or acrylate adduct of such diamine. In general, the foregoing object can be achieved by replacing up to about 50 molar percent of the polyalkylene polyamine by the diamine.

As the epihalohydrin to be used for preparing the chain extender of the formula (1) by reaction with the above polyalkylene polyamine, epichlorohydrin and epibromohydrin are effectively used, but epichlorohydrin is preferred. The polyalkylene polyamine used is selected so that the chain extender of the formula (1) contains at least two amino groups and at least two of the amino groups contained are primary or secondary amino groups. When the polyalkylene polyamine is reacted with the epihalohydrin to form a chain extender of the formula (1), it is preferred that both are reacted in the presence of an inert organic solvent, such as benzene.

In the reaction between the polyalkylene polyamine and epihalohydrin, the ratio of the two reactants differs depending on the number of amino groups contained in one molecule of the polyalkylene polyamine, but this ratio should be selected so that at least two primary or secondary amino groups are contained in one molecule of the product of the formula (1).

This reaction is generally conducted at a temperature of 10° to 80°C. When the reaction is carried out at too high a temperature, the product becomes resinous.

The reaction time varies depending on the reaction temperature and the kind of polyalkylene polyamine used, but it is generally preferred that the reaction is conducted for 0.5 to 5 hours.

Preparation of the isocyanate-terminated urethane prepolymer used in this invention is carried out in the presence of an inert solvent, such as benzene, or without a solvent.

When an aromatic polyisocyanate is used with the polyhydroxyl compound, a reaction temperature of 50° to 100°C is used, and when an aliphatic or alicyclic polyisocyanate is employed, a reaction temperature of 70° to 130°C is adopted.

In the preparation of the urethane prepolymer, it is preferred that the amount of the polyisocyanate is selected so that all of the hydroxyl groups are reacted with the isocyanate groups of the polyisocyanate.

More specifically, it is preferred that the ratio of the total mole number of the —NCO groups to the total mole number of the reactive hydrogen atoms (—OH groups) is within the range of from 1.1 : 1.0 to 5.0 : 1.0.

The reaction between the isocyanate-terminated urethane prepolymer and the chain extender of the formula (1) is preferably conducted under atmospheric pressure at a temperature ranging from −20° to +70°C in a ketone type solvent.

As the ketone type solvent, there can be employed, for example, acetone, methylethylketone, diethylketone, dipropylketone, methylisobutylketone and methylisopropylketone. Use of acetone and methylethylketone is especially preferred.

It is possible to employ a mixed solvent of a ketone type solvent with benzene, tetrahydrofuran, dioxane, an acetic acid ester, dimethylformamide or a chlorinated solvent.

The reaction time varies depending on the reaction temperature and the reactivity of the polyisocyanate compound used. A shorter or longer reaction time is adopted depending on the reaction conditions. The reaction is continued until the absorption at 2,250 cm$^{-1}$ owing to the —NCO group disappears in the infrared absorption spectrum measured on samples of the reaction mixture taken during the reaction. In general, the reaction is carried out for 0.5 to 2 hours.

In the reaction of the isocyanate groups at both ends of the urethane prepolymer molecule with the chain extender of the formula (1), it is critical that the total mole number of the primary and secondary amino groups is greater than the total mole number of the isocyanate groups. As the total mole number of the amino groups becomes close to the total mole number of the isocyanate groups, the molecular weight of the resulting polyurethane-urea-polyamine becomes great, and a gelled product or a product having a great tendency to become gelated is formed. If the mole number ratio of the amino groups to the isocyanate groups is too high, the molecular weight of the resulting polyurethane-urea-polyamine becomes small, and if such a low-molecular-weight polyurethane-urea-polyamine is used as an intermediate for preparing the polyurethane emulsion, it is impossible to obtain a resinous product of excellent physical properties from such an emulsion. It is preferred that the ratio of the number (B) of moles of active hydrogen-containing amino groups in the chain extender of the formula (1) to the number (A) of moles of isocyanate groups in the isocyanate-terminated urethane prepolymer is within the range of $1 < B/A \leqq 5$, especially $1 < B/A \leqq 3$. It is preferred that the polyurethane-urea-polyamine has a molecular weight of 5,000 to 100,000.

In the chain extender of the formula (1) there are present hydroxyl groups capable of reacting with isocyanate groups, but the reaction between the hydroxyl and isocyanate groups does not substantially proceed, because the rate of the reaction between primary or secondary amino groups and the isocyanate groups is much higher than the rate of the reaction between the hydroxyl groups and the isocyanate groups and because the number of primary and secondary amino groups is greater than the number of isocyanate groups. Accordingly, the hydroxyl groups contained in the chain extender are left substantially unreacted and they are connected to the resulting polyurethane-urea-polyamine in the free state (—OH).

The amino groups of the thus-formed polyurethane-urea-prepolymer are rendered amphoteric by reacting the polyurethane-urea-polyamine with a lactone, sultone or sodium monohalogenated carboxylate in an amount sufficient to emulsify the final polymer, or by reacting the polyurethane-urea-polyamine with an acrylate or methacrylate, or acrylonitrile and hydrolyzing the reaction product. When the resulting polymer is mixed with water, an amphoteric self-emulsifiable polyurethane emulsion is obtained. The solvent used for the reaction can be distilled off under heating, and the stability of the emulsion is not at all degraded by distillation of the solvent.

As the sultone, in this invention, it is preferred to employ 1,3-propanesultone and 1,4-butanesultone. As the lactone, it is preferred to employ β-propiolactone, γ-butyrolactone, ε-caprolactone and δ-valerolactone.

As the sodium monohalogenated carboxylate having the formula X′(CH$_2$)$_n$COONa, in which X′ is a halogen atom and $n$ is an integer of 1 to 2, there can be mentioned, for example, sodium monochloroacetate, sodium monochloropropionate, sodium monobromoacetate, sodium monobromopropionate, sodium monoiodoacetate, sodium monoiodopropionate, sodium monofluoroacetate and sodium monofluoropropionate. Among them, sodium monochloroacetate is preferred for carrying out the process on an industrial scale.

The reaction between the polyurethane-urea-polyamine and the above compound for rendering the amino groups amphoteric is generally conducted at a temperature of +40° to +70°C, for 3 to 7 hours. Completion of the reaction is confirmed based on the emulsified state observed when water is added to the reaction mixture and the mixture is agitated.

As the acrylate or methacrylate, it is preferred to use methyl acrylate, ethyl acrylate, methyl methacrylate and ethyl acrylate. Acrylonitrile can also be used.

The reaction between the polyurethane-urea-polyamine and the above acrylates and methacrylates is generally conducted at a temperature of 50° to 80°C for 3 to 7 hours. Thereafter the ester groups are hydrolyzed by adding an aqueous solution of an alkali and conducting hydrolysis at a temperature of from 40° to 70°C, for from 2 to 5 hours.

In general, the primary and secondary amino groups in the polyurethane-urea-polyamine are rendered amphoteric by reacting the polyurethane-urea-polyamine with an amphoteric compound (the above-mentioned specific sultone, lactone, sodium monohalogenated carboxylate or lower alkyl acrylate) in an amount sufficient to emulsify the final polymer. It is preferred that the mole ratio of such amphoteric agent to the total amino groups in the polyurethane-urea-polyamine is within the range of 0.5:1 to 2.0:1.

The polyurethane emulsion prepared according to the process of this invention is a so-called self-emulsifiable emulsion free of an emulsifier. But in order to improve the stability of the emulsion, it is permissible to add a known emulsifier in such an amount as will not drastically change the properties of the polyurethane resin.

According to the foregoing process, according to the invention, there can be obtained a low viscosity emulsion having ordinarily a resin content of 5 to 50 weight percent. The most prominent advantage of this invention is that the polyurethane resin contained is the thus-formed emulsion contains a reactive group —CH$_2$—CH(OH)—CH$_2$X, in which X is Cl or Br, which can form cross-linkages under heating.

When the polyurethane emulsion prepared according to this invention is impregnated into fibrous materials, non-woven fabrics, paper, leather, rubber, wood, metals, glass or plastics or is coated or sprayed on surfaces of these substrates and then the emulsion is dried, films having improved touch and surface coatings of improved properties can be obtained. Further, the emulsion prepared according to the process of this invention can be used in the fields of civil engineering and construction and also as an adhesive or the like.

This invention will now be further described by reference to the following illustrative Examples which by no means limit the scope of this invention.

In the Examples, all references to "parts" and "percent" are on a weight basis unless otherwise indicated.

EXAMPLE 1

1. 103 parts of diethylene triamine were dissolved in 103 parts of methyl ethyl ketone, and the solution was charged into a round-bottom flask equipped with an agitator and a thermometer. A solution formed by diluting 30.8 parts of epichlorohydrin with 30.8 parts of methyl ethyl ketone was added dropwise to the above solution over a period of 20 minutes at a temperature of 30° to 40°C, and the mixture was reacted under agitation at 45°C for 1.5 hours to obtain a solution of a chain extender.

The product contained covalently bonded chlorine but was free of epoxide groups.

2. 327 parts of polytetramethylene ether glycol (OH value = 54.9) dehydrated at 110°C under 30 mm Hg for 1 hour, 164 parts of benzene and 55.7 parts of a tolylene diisocyanate isomeric mixture of a 2,4-/2,6- molar ratio of 80/20 were charged in a flask equipped with a thermometer and an agitator, and the mixture was reacted under agitation at 75°C for 1.5 hours to obtain a solution of a urethane prepolymer having an isocyanate content of 2.43 percent.

8.11 parts of the thus-formed chain extender solution (concentration of 50 percent) was diluted with 200 parts of methyl ethyl ketone, and the diluted solution was well blended in a separable flask equipped with a thermometer and an agitator. Then, 89 parts of the urethane prepolymer solution was added dropwise to the above diluted chain extender over a period of 30 minutes, and the mixture was reacted at 50°C for 30 minutes.

A small amount of a sample was collected from the resulting polymer solution, and it was subjected to the infrared absorption spectrum analysis. It was confirmed that no absorption owing to the —NCO group was present at 2,250 cm$^{-1}$.

Then, 2.84 parts of β-propiolactone was added to the polymer solution and the mixture was reacted at 50°C for 1 hour. Then, 300 parts of water was added to the reaction product and the mixture was thoroughly blended. Methyl ethyl ketone and benzene were distilled off under reduced pressure to obtain a stable milky-white emulsion having a resin content of 20 percent.

The pH of the emulsion was 7.0, and the emulsion could be homogeneously diluted with water to various concentrations.

This emulsion was cast into a plate having a Teflon-coated surface and then was air-dried to obtain a transparent flexible film. When this film was heat-treated at 120°C for 20 minutes, a film having the following properties was obtained:

| | |
|---|---|
| 100 percent modulus | 18 Kg/cm$^2$ |
| 300 percent modulus | 38 Kg/cm$^2$ |
| Tensile strength | 362 Kg/cm$^2$ |
| Elongation | 720 percent |

COMPARATIVE EXAMPLE 1

3.2 parts of diethylene triamine diluted with 200 parts methyl ethyl ketone was charged into a round-bottom flask equipped with a thermometer and an agitator, and 89 parts of the urethane prepolymer solution obtained in Example 1 was added dropwise to the diluted triamine at 30°C over a period of 30 minutes and the mixture was reacted under agitation at 50°C for 30 minutes.

Then, 2.8 parts of epichlorohydrin was added to the reaction mixture, and the reaction was conducted at 50°C for 1 hour. Then, 2.8 parts of β-propiolactone was added to the reaction mixture, and the reaction was further conducted at 50°C for 1 hour. The reaction product was thoroughly mixed with 300 parts of water, and methyl ethyl ketone and benzene were distilled off under reduced pressure to obtain an emulsion having a resin content of 20 percent.

The mechanical properties of a film obtained from this emulsion heat-treated in the same manner as described in Example 1 were as follows:

| | |
|---|---|
| 100 percent modulus | 17 Kg/cm$^2$ |
| 300 percent modulus | 30 Kg/cm$^2$ |
| Tensile strength | 282 Kg/cm$^2$ |
| Elongation | 750 percent |

When Example 1 (process of this invention) is compared with Comparative Example 1, it will readily be understood that the film formed from the polyurethane emulsion prepared according to the process of this invention had unexpectedly improved mechanical properties.

EXAMPLE 2

The procedures of Example 1 were repeated in the same manner except that 4.81 parts of 1,3-propanesultone was used instead of 2.84 parts of β-propiolactone and the reaction was conducted at 50°C for 1 hour. In the same manner as in Example 1, 300 parts of water was added to the reaction mixture to obtain a homogeneous stable milky-white emulsion having a pH of 7.0 and a resin content of 20 percent. This emulsion could be homogeneously diluted with water to various concentrations.

A film prepared from this emulsion and heat-treated in the same manner as described in Example 1 had the following mechanical properties:

| | |
|---|---|
| 100 percent modulus | 21 Kg/cm² |
| 300 percent modulus | 34 Kg/cm² |
| Tensile strength | 298 Kg/cm² |
| Elongation | 84 percent |

COMPARATIVE EXAMPLE 2

The procedures of Comparative Example 1 were repeated in the same manner except that 4.81 parts of 1,3-propanesultone was used instead of 2.84 parts of β-propiolactone and the reaction was conducted at 50°C for 1 hour. Then, in the same manner as in Comparative Example 1, 300 parts of water was added to the resulting reaction product to obtain an emulsion having a resin content of 20 percent.

A film prepared from this emulsion and heat-treated in the same manner as described in Example 1 had the following mechanical properties:

| | |
|---|---|
| 100 percent modulus | 20 Kg/cm² |
| 300 percent modulus | 28 Kg/cm² |
| Tensile strength | 223 Kg/cm² |
| Elongation | 810 percent |

When Example 2 (process of this invention) is compared with Comparative Example 2, it will readily be understood that the film obtained from the emulsion prepared according to the process of this invention had unexpectedly improved mechanical properties.

EXAMPLE 3

A solution of 103 parts of diethylene triamine in 103 parts of methyl ethyl ketone was charged in a round-bottom flask equipped with a thermometer and an agitator, and a solution of 92.5 parts of epichlorohydrin in 92.5 parts of epichlorohydrin was added dropwise to the above solution over a period of 30 minutes at 30° to 45°C. The mixture was reacted at 45°C for 1.5 hours to obtain a solution of a chain extender free of epoxide groups but containing covalently-bonded chlorine.

Separately, 202 parts of polytetramethylene ether glycol (OH value of 55.3) dehydrated at 100°C under 10 mm Hg for 1 hour, 90 parts of benzene and 34.8 parts of an 80 : 20 mixture of 2,4- and 2,6-tolylene diisocyanates were reacted under agitation at 80°C to form a solution of a urethane prepolymer having a terminal isocyanate group content of 2.50 percent.

Another flask equipped with an agitator and a thermometer was charged with 14.5 parts of the above chain extender solution and 250 parts of methyl ethyl ketone, and 100 parts of the above prepolymer solution was added dropwise to the mixture over a period of 2 hours at a temperature maintained at 10°C by external ice cooling. Then, the reaction was conducted at 50°C for 30 minutes.

Then, 5.2 parts of methyl acrylate was added to the reaction mixture and the reaction was conducted at 70°C for 5 hours under agitation. Then, a solution of 1.0 part of sodium hydroxide in 20 parts of water was added to the reaction mixture, and the mixture was heated at 60°C for 3 hours under agitation to hydrolyze the methyl ester.

Then, 200 parts of water was added to the resulting polymer solution, and benzene and methyl ethyl ketone were distilled off under reduced pressure and the concentration was adjusted by addition of water.

Thus was obtained a low viscosity stable emulsion having a resin content of 25 percent.

In the preparation of this polyurethane emulsion, if the methyl acrylate addition reaction or the methyl ester hydrolysis reaction were insufficient, when 200 parts of water was added, gelation was caused to occur or the resulting emulsion became unstable. Accordingly, it is important that both of the above two reactions should be conducted sufficiently.

A film prepared from this emulsion and heat-treated in the same manner as described in Example 1 had the following properties:

| | |
|---|---|
| 100 percent modulus | 17 Kg/cm² |
| 300 percent modulus | 23 Kg/cm² |
| Tensile strength | 308 Kg/cm² |
| Elongation | 770 percent |

EXAMPLE 4

708 parts of polyoxypropylene glycol (OH value of 158.5) and 414 parts of lysine diisocyanate were reacted at 100°C for 3 hours to obtain a urethane prepolymer having a terminal isocyanate group content of 7.45 percent.

Another flask was charged with 61.2 parts of the chain extender solution prepared in Example 3 and 300 parts of methyl ethyl ketone and they were blended thoroughly. A solution formed by diluting 150 parts of the above urethane prepolymer with 100 parts of benzene was added dropwise to the above mixture over a period of 20 minutes at a temperature maintained at 20°C, and then the mixture was maintained at 50°C for 30 minutes.

Then, 14.7 parts of β-propiolactone was added to the resulting reaction mixture, and the reaction was conducted at 50°C for 2 hours under agitation. Then, 600 parts of water was placed into the resulting reaction mixture and thoroughly blended therewith. Then, the solvents were distilled off under reduced pressure and the concentration was adjusted by addition of water to obtain a homogeneous stable semi-transparent emulsion having a resing content of 20 percent.

A film prepared from this emulsion and heat-treated in the same manner as described in Example 1 had the following mechanical properties:

| | |
|---|---|
| 100 percent modulus | 22 Kg/cm² |
| 300 percent modulus | 47 Kg/cm² |
| Tensile strength | 236 Kg/cm² |
| Elongation | 580 percent |

EXAMPLE 5

A mixture of 2,036 parts of poly-(ethylene adipate)-glycol (OH value = 55.1) prepared from ethyleneglycol and adipic acid by dehydrating condensation, 420 parts of 1,5-naphthylene diisocyanate and 2456 parts of methyl ethyl ketone was reacted at 75°C for 4 hours to obtain a solution of a urethane prepolymer having a terminal isocyanate group content of 1.69 percent.

Another round-bottom flask was charged with 18.5 of the chain extender solution obtained in Example 3 and 400 parts of acetone, and 200 parts of the above urethane prepolymer solution was added dropwise to the mixture over a period of 35 minutes at a temperature maintained at 5°C. Then, the mixture was heated at 50°C for 30 minutes under agitation.

Then, 7.5 parts of propanesultone was added to the above reaction mixture, and the reaction was conducted at 60°C under agitation for 1.5 hours. Then, 400 parts of water was placed into the reaction mixture and blended therewith, and acetone and methyl ethyl ketone were distilled off under reduced pressure. Then, the concentration was adjusted by addition of water.

There was obtained a milky-white homogeneous stable emulsion having a resin content of 20 percent.

A film prepared from this emulsion and heat-treated in the same manner as in Example 1 had the following mechanical properties:

| | |
|---|---|
| 100 percent modulus | 28 Kg/cm² |
| 300 percent modulus | 63 Kg/cm² |
| Tensile strength | 346 Kg/cm² |
| Elongation | 520 percent |

The embodiments of the invention in which an exclusive property or privilege is claimed are defined as follows:

1. A process for preparing an amphoteric polyurethane emulsion, which comprises,
   1. reacting, in the liquid phase and in a ketone solvent, at a temperature of from −20° to +70°C, (A) isocyanate-terminated urethane prepolymer prepared by reacting organic polyol having a molecular weight in the range of from 200 to 10,000 with an excess of organic polyisocyanate, with (B) an excess of polyalkylene polyamine having at least two primary or secondary amino groups and also having a functional group of the formula —CH₂—CH(OH)—CH₂X, wherein X is chloro or bromo, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting, in the liquid phase the reaction product of step 1 with either
      a. a substance selected from the group consisting of sultones, lactones and sodium monohalogenated carboxylate, at a temperature of +40° to +70°C, for 3 to 7 hours, the amount of said substance being in the range of 0.5 to 2.0 moles per one mole of amino groups of the polyurethane-ureapolyamine and sufficient to render amphoteric the amino groups of the reaction product of step 1 so that a stable emulsion is formed when water is added and blended in the product of step 2(a), or
      b. a substance selected from the group consisting of alkyl acrylates, alkyl methacrylates and acrylonitrile, at a temperature of 50 to 80°C, for 3 to 7 hours and then hydrolyzing the reaction products, the amount of said substance in the range of 0.5 to 2.0 moles per the mole of amino groups of the polyurethane-urea-polyamine and being sufficient to render amphoteric the amino group of the reaction product of step 1 so that a stable emulsion can be formed when water is added and blended in the product of step 2(b),
   3. treating the product of step 2 to remove the organic solvent therefrom and adding water thereto and thereby obtaining an aqueous amphoteric polyurethane emulsion as a final product.

2. A process according to claim 1, in which the reactant (B) includes up to 50 percent, by molecular equivalent, of diamines of alkylene oxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is in the range of $1 < b \leq 5/a$.

4. A process according to claim 1, in which the polyalkylene polyamine has the formula

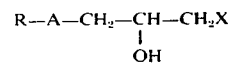

wherein X is Cl or Br, A is a secondary or tertiary amino group and R is alkylene having at least one primary or secondary amino group, provided that the sum of the primary and secondary amino groups in the polyalkylene polyamine is at least two.

5. A process according to claim 4, in which said polyalkylene polyamine is prepared by reacting, at from 10° to 80°C, for from 0.5 to 5 hours, epichlorohydrin epibromohydrin with a polyamine having the formula

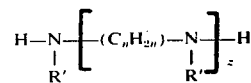

wherein $n$ is an integer larger than one, $z$ is an integer from 2 to 4 and R′ is hydrogen, alkyl having one to 4 carbon atoms or hydroxyalkyl having one to 4 carbon atoms.

6. A process according to claim 1, in which the step 2(a) said substance is selected from the group consisting of 1,3-propanesultone, 1,4-butanesultone, β-propiolactone, γ-butyrolactone, ε-caprolactone, δ-valerolactone and X(CH₂)ₙCOONa, in which X is halogen and $n$ is an integer of 1 or 2.

7. A process according to claim 1, in which in step 2(b) said substance is selected from the group consisting of methyl acrylate, ethyl acrylate, methyl methacrylate, ethyl methacrylate and acrylonitrile.

8. An aqueous amphoteric polyurethane emulsion prepared by the process of claim 1.

9. A polyurethane molded product prepared by forming the emulsion of claim 8 into a molded product and then heat-treating the product to effect cross-linking.

* * * * *

UNITED STATES PATENT OFFICE
CERTIFICATE OF CORRECTION

Patent No. 3 903 032      Dated September 2, 1975

Inventor(s) Kazuo Matsuda, Hidemasa Ohmura and Hirakazu Aritaki

It is certified that error appears in the above-identified patent and that said Letters Patent are hereby corrected as shown below:

Col. 12, line 23; please change the formula to:

$$--- 1 < b/a \leq 5 ---.$$

Col. 12, line 49; change "the step" to ---in step---.

Signed and Sealed this

Eleventh Day of January 1977

[SEAL]

Attest:

RUTH C. MASON
*Attesting Officer*

C. MARSHALL DANN
*Commissioner of Patents and Trademarks*